Patented Aug. 4, 1953

2,647,866

UNITED STATES PATENT OFFICE 2,647,866

ELECTROPLATING OF NICKEL

Henry Brown, Detroit, Mich., assignor to The Udylite Corporation, Detroit, Mich., a corporation of Delaware No Drawing. Application July 17, 1950,
Serial No. 174,374

18 Claims. (Cl. 204—49)

My invention relates to improvements in the electrodeposition of nickel from aqueous acidic baths. It is particularly concerned with the utilization of mixtures of certain types of agents for the purpose of decreasing grain size and increasing the luster of the nickel plate or deposit, and it is especially concerned with the production of electrodeposits of brilliant, highly lustrous, ductile nickel plates.

I have discovered that the above highly desired results are achieved through the conjoint utilization, in the nickel plating bath, of one or more agents of the type exemplified in the following Table I (added as such or formed in situ in the bath), in conjunction with one or more agents of the type exemplified in the following Table II.

The agents of Table I are illustrative of the class of compounds, found to be useful in the practice of my present invention, in accordance with the formula

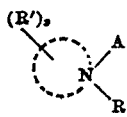

where

represents a compound of the pyridine series selected from the group consisting of pyridine, quinoline, isoquinoline and C-methyl and ethyl homologues thereof; A is an anion of a water-soluble acid; R is an aliphatic radical containing from 1 to 4, and particularly from 1 to 3, carbon atoms; R' is halogen, such as chlorine, bromine and iodine, but particularly chlorine and bromine, and $x$ is zero to 2.

The aliphatic radical R encompasses both saturated and unsaturated radicals and includes not only hydrocarbon radicals such as methyl, ethyl, propyl, butyl and vinyl radicals but, also, hydroxy-alkyl radicals such as hydroxy-methyl, 2-ethanol and 3-propanol, and radicals containing ester linkages such as the methyl acetate and ethyl acetate radicals. Especially advantageous are those compounds where

is 2-methyl quinoline, 8-methyl quinoline, 2,6-dimethyl quinoline, isoquinoline, and 3-methyl isoquinoline, and where R is the allyl or methyl acetate radical, and particularly outstanding are N-allyl pyridinium bromide; N-allyl-2-methyl pyridinium bromide; N-methyl acetate-2-methyl quinolinium chloride; N-methyl acetate-2,6-dimethyl quinolinium chloride; N-allyl isoquinolinium bromide; N-allyl-3-methyl isoquinolinium chloride; N-methyl acetate isoquinolinium chloride; N-methyl acetate-3-methyl-isoquinolinium chloride; and mixtures of any two or more thereof.

The anion represented by A can be any one of a number such as, for example, chlorine, bromine, iodine, sulfate, methosulfate ($CH_3$—$SO_4$), acetate, citrate, and tartrate. Particularly desirable are the compounds where A is bromine or chlorine.

As indicated, R' is halogen and, as $x$ can be zero, 1 or 2, the compounds can contain one or two nuclear halogen groups or, where $x$ is zero, the nucleus is unsubstituted. Excellent results are obtained with compounds where $x$ is zero; or where R' is chlorine or bromine and $x$ is 1.

The particular types of pyridinium compounds, quinolinium compounds, and isoquinolinium compounds utilized pursuant to my present invention can, individually, be represented by the formulae:

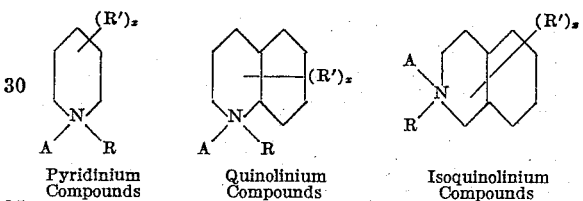

| Pyridinium Compounds | Quinolinium Compounds | Isoquinolinium Compounds |

In the said compounds, the letters A, R, R' and $x$ have the foregoing significance. In all instances, the bond leading from the radical R' indicates that said radical can be substituted at any of the positions of the ring of the pyridine, quinoline or isoquinoline radical. The compounds can be made, in accordance with known procedures, by reacting the pyridine, quinoline, isoquinoline, the C-methyl and ethyl homologues thereof, and their halogen substituted products with alkyl, alkenyl, and other halides and the like as, for example, ethyl bromide, allyl chloride, allyl bromide, methyl chloracetate, ethyl chloracetate, allyl chloracetate, ethylene chlorhydrin, tertiary butyl bromide, ethylene bromhydrin, propylene chlorhydrin, epichlorhydrin, and dimethyl sulfate.

Of outstanding utility are, among others, N-allyl pyridinium bromide or chloride and N-allyl quinolinium bromide or chloride, and mixtures thereof in a ratio of about 2:1 to about 1:2 of the said pyridinium to the said quinolinium compounds. The preferred N-allyl quinolinium compound is N-allyl 2 methyl quinolinium bromide or chloride (N-allyl quinaldinium bromide or chloride).

Table I

| Compound No. | Compound | Optimum Conc., Grams/Liter |
|---|---|---|
| 1 | N-allyl pyridinium bromide | .01-.08 |
| 2 | N-allyl quinolinium bromide | .01-.04 |
| 3 | N-allyl isoquinolinium bromide | .005-.04 |
| 4 | N-(β-hydroxy ethyl)pyridinium chloride | .01-.08 |
| 5 | N-(β-hydroxy ethyl)-a-chloro-pyridinium chloride | .01-.08 |
| 6 | N-ethyl pyridinium sulfate | .01-.08 |
| 7 | N-propyl pyridinium iodide | .01-.08 |
| 8 | N-ethyl-2,4-dimethyl pyridinium sulfate | .01-.08 |
| 9 | N-ethyl-2-bromo pyridinium iodide | .01-.08 |
| 10 | N-methyl quinolinium sulfate | .01-.04 |
| 11 | N-ethyl quinolinium bromide | .01-.04 |
| 12 | N-ethyl-2-methyl quinolinium bromide | .003-.04 |
| 13 | N-(β-hydroxy ethyl)quinolinium chloride | .01-.04 |
| 14 | N-propanol quinolinium chloride | .003-.03 |
| 15 | N-allyl-2,6-dimethyl quinolinium bromide | .003-.04 |
| 16 | N-ethyl-2-methyl quinolinium chloride | .01-.04 |
| 17 | N-allyl-2-bromo quinolinium bromide | .01-.04 |
| 18 | N-allyl-6-bromo quinolinium bromide | .01-.04 |
| 19 | N - (β - hydroxy - ethyl)isoquinolinium chloride | .005-.04 |
| 20 | N-ethyl isoquinolinium bromide | .01-.04 |
| 21 | N-methyl acetate quinolinium chloride | .005-.03 |
| 22 | N-allyl-2-methyl pyridinium bromide | .01-.08 |
| 23 | N-allyl-4-bromo pyridinium chloride | .01-.08 |
| 24 | N-allyl-2,4-dimethyl quinolinium bromide | .005-.04 |
| 25 | N-allyl-2,4-dichloro quinolinium bromide | .01-.04 |
| 26 | N-allyl-4-ethyl pyridinium bromide | .01-.08 |
| 27 | N-allyl-2,8-dimethyl quinolinium chloride | .01-.03 |
| 28 | N-allyl-5,8-dimethyl quinolinium bromide | .01-.04 |
| 29 | N-allyl-3-ethyl pyridinium bromide | .01-.08 |
| 30 | N-allyl-1,3-dimethyl isoquinolinium bromide | .003-.04 |
| 31 | N-allyl-3-methyl pyridinium chloride | .01-.04 |
| 32 | N-allyl-2-methyl-4-ethyl pyridinium chloride | .01-.08 |
| 33 | N-allyl-2-methyl-4-ethyl pyridinium bromide | .01-.08 |
| 34 | N-allyl-8-methyl quinolinium chloride | .01-.04 |
| 35 | N-allyl-2,4-dimethyl pyridinium bromide | .01-.08 |
| 36 | N-allyl-3-chloro-2-methyl quinolinium chloride | .01-.04 |
| 37 | N-allyl-3-bromo-2-methyl quinolinium bromide | .01-.04 |
| 38 | N-methallyl pyridinium bromide | .01-.08 |
| 39 | N-methallyl quinolinium bromide | .01-.04 |
| 40 | N-methallyl pyridinium chloride | .01-.08 |
| 41 | N-methallyl quinolinium chloride | .01-.04 |
| 42 | N-methallyl isoquinolinium chloride | .01-.04 |
| 43 | N-methallyl-2-methyl pyridinium chloride | .01-.08 |
| 44 | N-allyl-3-bromo pyridinium bromide | .01-.08 |
| 45 | N-allyl-2-chloro pyridinium bromide | .01-.08 |
| 46 | N-allyl-3-methyl isoquinolinium bromide | .01-.04 |
| 47 | N-allyl-8-methyl quinolinium bromide | .01-.04 |
| 48 | N-ethyl acetate-2-methyl quinolinium chloride | .01-.04 |
| 49 | N-butyl quinolinium chloride | .01-.04 |
| 50 | N-butyl-2-methyl pyridinium chloride | .01-.05 |
| 51 | N-4-tert butyl pyridinium bromide | .01-.05 |
| 52 | N-4-tert butyl quinolinium bromide | .01-.05 |
| 53 | N-butyl-2-methyl quinolinium chloride | .01-.04 |
| 54 | N-butyl-8-methyl quinolinium chloride | .01-.04 |
| 55 | N-butyl isoquinolinium chloride | .01-.04 |
| 56 | N-butyl-3-methyl isoquinolinium bromide | .01-.04 |
| 57 | N-allyl 2-methyl quinolinium bromide | .001-.04 |
| 58 | N-methyl acetate 2-methyl pyridinium chloride | .01-.20 |
| 59 | N-ethyl acetate pyridinium chloride | .01-.15 |
| 60 | N-methyl acetate pyridinium chloride | .01-.15 |

The agents of Table II are illustrative of the class of compounds which are employed in conjunction with the agents of Table I, in the practice of my invention. The agents of Table II, it will be noted, fall into the category of organic sulfonamides, sulfonimides, and sulfonic acids. They have heretofore been used as brighteners in nickel plating baths as is disclosed in part, for example, in my prior Patents Nos. 2,191,813 and 2,466,677. In the practice of my present invention, a coaction takes place in the cathode film, the exact nature of which is unknown, involving the compounds of the type shown in Table I and the organic sulfur-containing brightener which produces the unusual and highly important results which are brought about in accordance with my invention. In this connection, it may be noted that the utilization alone of the agents or compounds of the type shown in Table I, or the utilization alone of the organic sulfur-containing brighteners gives no indication of the remarkably enhanced results which occur when both types of compounds are present in the bath, particularly when utilized in their optimum concentrations. In general, it is desirable to use mixtures of two or more of said sulfur-containing brighteners as, for example, o-benzoyl sulfimide and p-toluene sulfonamide.

Table II

| Sulfur-Containing Brighteners | Optimum Conc., Grams/Liter |
|---|---|
| 1. Benzene sulfonamide | 0.1-3 |
| 2. Toluene sulfonamides (o- and p-) | 0.1-2 |
| 3. o-Benzoyl sulfimide | 0.1-2 |
| 4. N-Benzoyl benzene sulfonimide | 0.1-1 |
| 5. p-Toluene sulfonchloramide | 0.1-1 |
| 6. p-Brom benzene sulfonamide | 0.1-1 |
| 7. 6-Chlor o-benzoyl sulfimide | 0.1-1 |
| 8. m-Aldehydo benzene sulfonamide | 0.1-1 |
| 9. Sulfomethyl benzene sulfonamide | 0.1-6 |
| 10. Benzene sulfonamide m-carboxylic amide | 0.1-3 |
| 11. 7-Aldehydo o-benzoyl sulfimide | 0.1-3 |
| 12. N-Acetyl benzene sulfonimide | 0.1-2 |
| 13. Methoxy benzene sulfonamides | 0.1-1 |
| 14. Hydroxymethyl benzene sulfonamide | 0.1-2 |
| 15. Vinyl sulfonamide | 4-12 |
| 16. Allyl sulfonamide | 4-12 |
| 17. Benzene sulfonic acids (mono-, di-, and tri-) | 1-15 |
| 18. p-Brom benzene sulfonic acid | 3-6 |
| 19. Benzaldehyde sulfonic acids (o, m, p) | 2-6 |
| 20. Diphenyl sulfone sulfonic acid | 1-8 |
| 21. Naphthalene sulfonic acids (mono-, di-, and tri-) | 1-8 |
| 22. Benzene sulfohydroxamic acid | 1-5 |
| 23. p-Chlor benzene sulfonic acid | 1-15 |
| 24. Diphenyl sulfonic acid | 1-5 |
| 25. m-Diphenyl benzene sulfonic acid | 1-4 |
| 26. 2-Chloro-5-sulfobenzaldehyde | 1-5 |
| 27. m-Benzene disulfonamide | 0.5-1 |
| 28. Allyl sulfonic acid | 4-12 |

It will be understood that said sulfonic brighteners may be utilized in their acid form or in the form of salts as, for example, nickel, sodium, potassium or other salts. Especially satisfactory, for use in the practice of my present invention, are the compounds of Table II corresponding to numbers 1, 2, 3; 18, 19, 21 and 28, the latter particularly in the form of their nickel salts. Where the term sulfonic acids is used herein and in the claims, it will be understood that the salts thereof are likewise included.

The compounds of Table II, used alone, produce reasonably bright deposits on buffed metals such as buffed brass. However, at least in the ordinary case, they do not accomplish the same results on steel polished with 180 emery or on matte (but unburnt) copper plate of 0.0003"-0.0005" thickness but, rather, generally yield plates of somewhat dull and gray appearance in these cases. The compounds of Table I, in the usual case, when used alone, give a different type of plate than that produced by the compounds of Table II. The plates produced with the compounds of Table I alone are fine grained and cloudy at very low concentrations, and are rather dark, brittle, easily stained and have poor adherence characteristics at higher concentrations. If, however, the two different types of compounds represented in Tables I and II are used together in the baths, as I have indicated above, brilliant mirror-like, adherent and ductile deposits are obtained even over matte surfaces.

The compounds of Table I are, in general, quite soluble in the usual nickel electroplating baths. Only small proportions of said compounds or mixtures thereof are necessary to achieve the aforesaid results. Generally, proportions in the range of about 0.003 gram/liter to about 0.04 gram/liter of the quinoline and isoquinoline compounds, and in the range of about 0.01 gram/liter to about 0.15 gram/liter of the pyridine compounds, or mixtures of said compounds, will be most effective in the usual case although, particularly with the more efficacious ones of the compounds, proportions even as low as about 0.001 gram/liter give good results. Even in the case of the less effective ones of the pyridine compounds, it is rarely necessary to exceed about 0.2 gram/liter. As a general rule, the optimum concentration of the quinoline and isoquinoline compounds will be found to be within the range of about 0.005 to about 0.03 gram/liter, and of the pyridine compounds the optimum concentration will be found to be within the range of about 0.03 to about 0.1 gram/liter.

The compounds of Table II are likewise used in small proportions, in conjunction with the compounds of Table I, amounts of the order of about 0.1 gram/liter to 2 or 3 grams/liter being effective in the usual case. Higher proportions, up to saturation, can, however, be utilized. Ordinarily, it is unecessary to exceed about 0.5%.

The optimum concentration of the compounds of Tables I and II in any specific instance may readily be determined by simple test in the light of the particular nickel bath utilized, its temperature, its pH, etc.

The aqueous nickel plating baths may be of various types but, in all cases, they are acidic in character. The preferred baths are of the so-called acidic "gray" type which are capable of producing thick, adherent, ductile deposits, those of the Watts' type or modifications thereof being particularly desirable. The nickel salts may comprise nickel chloride, nickel sulfate, nickel fluoborate, nickel sulfamate, or other nickel salts or mixtures of any two or more of said nickel salts, preferably in conjunction with buffer materials as, for example, boric acid. I prefer to utilize boric acid in the bath as it is, in general, the best cathode film buffer. Other buffers of acidic character may, however, be employed as, for example, formic acid, citric acid, fluoboric acid, and the like, and such may be used either in place of or in conjunction with boric acid. For optimum results, the concentration of the boric acid or its equivalent should be above 30 grams per liter, especially in baths operated at somewhat elevated temperatures. The baths may also contain various supplemental agents such as anti-pitting agents and the like.

The baths can be operated at temperatures ranging from about room temperature to almost boiling but, in general, the preferred temperature is in the range of about 40 degrees C. to 65 degrees C. In general, the baths can be operated at pH values ranging from about 2 to about 5.5 but, in the ordinary case, the preferred pH values are from 2.5 to 4.8. The cathode current density ranges are quite variable, a range of about 5 to several hundred amperes per square foot being utilizable, the optimum depending upon agitation, temperature, and concentration and type of nickel salts utilized in the bath. A good working range is about 20 to about 80 amperes per square foot. In Table III, I list preferred embodiments of bath compositions.

Table III

| Bath No. | $NiSO_4 \cdot 6H_2O$ Grams/liter | $NiCl_2 \cdot 6H_2O$ Grams/liter | $Ni(BF_4)_2$ Grams/liter | $H_3BO_3$ Grams/liter | Temperature °F. | pH | Current Density, Amps./sq. ft. | Addition Agents, Grams/liter |
|---|---|---|---|---|---|---|---|---|
| 1 | 200 to 300 | 45 | | 40 | 75 to 160 | 2 to 6 | 10 to 75 | N-allyl pyridinium bromide—.04. o-benzoyl sulfimide—1. |
| 2 | | 300 | | 40 | 75 to 160 | 1 to 5 | 10 to 100 | N-allyl quinolinium bromide—.03. Benzene sulfonamide—2. o-benzoyl sulfimide—2. |
| 3 | 50 to 200 | 100 to 250 | | 40 | 75 to 160 | 1.5 to 6 | 10 to 85 | N-allyl-2-methyl pyridinium bromide—.04. p-toluene sulfonamide—1.5. o-benzoyl sulfimide—0.4 to 2. |
| 4 | 200 to 300 | 45 to 75 | 4 to 75 | 40 to 50 | 75 to 160 | 2 to 6 | 10 to 75 | N-allyl-8-methyl-quinolinium chloride—.03. Benzene sulfonamide—2. |
| 5 | 200 to 300 | 45 to 100 | 8 to 50 | 40 to sat | 75 to 160 | 2 to 6 | 10 to 85 | N-allyl isoquinolinium bromide—.01 to .03. o-benzoyl sulfimide—2. |
| 6 | 50 to 100 | 45 to 100 | 8 to 100 | 40 to sat | 75 to 160 | 2 to 6 | 10 to 85 | N-ethyl quinolinium bromide—.03. o-benzoyl sulfimide—1. p-toluene sulfonamide—1. |
| 7 | | 45 to 100 | 50 to 150 | 40 to sat | 75 to 160 | 2 to 6 | 10 to 100 | N-methallyl pyridinium bromide—.03. o-benzoyl sulfimide—1. Benzene sulfonamide—1. |
| 8 | 200 to 250 | 100 to 150 | 8 to 15 | 40 to 50 | 75 to 160 | 2 to 6 | 10 to 85 | N-allyl-2-methyl pyridinium bromide—.03. N-allyl quinolinium bromide—.003. Benzaldehyde sulfonic acid—3 to 8. |
| 9 | | | 100 to 300 | 0 to sat | 75 to 160 | 4 to 5 | 10 to 200 | N-allyl pyridinium bromide—.03. N-allyl-2-methyl pyridinium bromide—.02. Naphthalene sulfonic acids—3 to 6. |
| 10 | 200 to 300 | 100 to 75 | | 40 | 110 to 140 | 3 to 4.5 | 40 to 60 | N-ethanol quinolinium chloride—.002 to .020. Allyl sulfonic acid—6. |
| 11 | 100 to 200 | 200 to 100 | | 40 | 110 to 140 | 3 to 4.5 | 40 to 60 | N-ethyl-2,6-dimethyl quinolinium iodide—.002 to .020. o-benzoyl sulfimide—1. p-toluene sulfonamide—1. |

Table III—Continued

| Bath No. | NiSO₄.6H₂O Grams/liter | NiCl₂.6H₂O Grams/liter | Ni(BF₄)₂ Grams/liter | H₃BO₃ Grams/liter | Temperature °F. | pH | Current Density. Amps./sq. ft. | Addition Agents, Grams/liter |
|---|---|---|---|---|---|---|---|---|
| 12 | 300 | 60 | | 40 | 70 to 160 | 2.5 to 4.8 | 40 to 60 | N-allyl-2-methyl quinolinium bromide—.003. N-methyl acetate-2-methyl quinolinium chloride—.01 to .02. p-toluene sulfonamide 1 to 3. o-benzoyl sulfimide 1 to 3. |
| 13 | 225 | 50 to 75 | | 40 | 70 to 160 | 2.5 to 4.8 | 40 to 60 | N-allyl-3-methyl isoquinolinium chloride—.004 to .02. Benzene sulfonamide—2. o-benzoyl sulfimide—2. |
| 14 | 300 | 60 | | 40 | 70 to 160 | 2.5 to 4.8 | 40 to 60 | N-allyl-2-methyl quinolinium bromide—.01 to .02. N-allyl isoquinolinium bromide—.006. Benzene sulfonamide—2. o-benzoyl sulfimide—2. |

It will be understood that, from time to time, it is necessary to replenish the bath to replace losses due to cathode processes, to "drag-out," and to other causes, in order to maintain the concentrations of the added compounds, etc. in operative proportions.

This application is a continuation-in-part of my application Serial No. 663,758, filed April 20, 1946, and also of my application Serial No. 625,962, filed October 26, 1945, which is a continuation-in-part of my application Serial No. 587,428, filed April 9, 1945, said latter application being, in turn, a continuation-in-part of my application Serial No. 366,386, filed November 20, 1940, all of which are now abandoned.

What I claim as new and desire to protect by Letters Patent of the United States is:

1. A bath for the electrodeposition of bright nickel comprising an aqueous acidic solution of at least one nickel salt selected from the group consisting of nickel chloride and nickel sulfate, said bath also containing, in solution, not more than about 1.5% of at least one brightener selected from the group consisting of organic sulfonamides, sulfonimides, and sulfonic acids, and, in addition, about .003 to 0.15 gram per liter of a bath-soluble compound in accordance with the formula

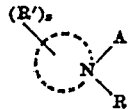

where

represents a compound of the pyridine series selected from the group consisting of pyridine, quinoline, isoquinoline and C-methyl and ethyl homologues thereof, A is an anion of a water-soluble acid, R is an aliphatic radical containing from 1 to 4 carbon atoms, R' is halogen selected from the group consisting of chlorine and bromine, and $x$ is zero to 2.

2. A bath in accordance with claim 1, wherein R is allyl.

3. A bath in accordance with claim 1, wherein A is an anion selected from the group consisting of chlorine and bromine, R is allyl, and $x$ is zero.

4. A bath in accordance with claim 1, wherein A is an anion selected from the group consisting of chlorine and bromine, R is allyl, and $x$ is zero.

5. A bath for the electrodeposition of bright nickel comprising an aqueous acidic solution of at least one nickel salt selected from the group consisting of nickel chloride and nickel sulfate, said bath also containing, in solution, not more than about .5% of at least one brightener selected from the group consisting of organic sulfonamides, sulfonimides, and sulfonic acids, and, in addition, about .01 to .15 gram per liter of a bath-soluble compound in accordance with the formula

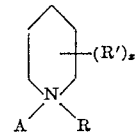

where A is an anion of a water-soluble acid, R is an aliphatic radical containing from 1 to 4 carbon atoms, R' is halogen, and $x$ is zero to 2.

6. A bath for the electrodeposition of bright nickel comprising an aqueous acidic solution of at least one nickel salt selected from the group consisting of nickel chloride and nickel sulfate, said bath also containing, in solution, not more than about 0.5% of at least one brightener selected from the group consisting of organic sulfonamides, sulfonimides, and sulfonic acids, and, in addition, about 0.01 to 0.15 gram per liter of a bath-soluble compound in accordance with the formula

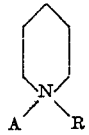

where A is an anion selected from the group consisting of chlorine and bromine, and R is an aliphatic radical containing from 1 to 4 carbon atoms.

7. A bath for the electrodeposition of bright nickel comprising an aqueous acidic solution of at least one nickel salt selected from the group consisting of nickel chloride and nickel sulfate, said bath also containing, in solution, not more than about 0.5% of at least one brightener selected from the group consisting of organic sulfonamides, sulfonimides, and sulfonic acids, and, in addition, about .003 to 0.04 gram per liter of a bath-soluble compound in accordance with the formula

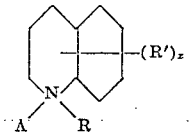

where A is an anion selected from the group consisting of chlorine and bromine, R is an aliphatic radical containing from 1 to 4 carbon atoms, R' is halogen selected from the group consisting of chlorine and bromine, and $x$ is zero to 2.

8. A bath for the electrodeposition of bright nickel comprising an aqueous acidic solution of at least one nickel salt selected from the group consisting of nickel chloride and nickel sulfate, said bath also containing, in solution, not more than about .5% of at least one brightener selected from the group consisting of organic sulfonamides, sulfonimides, and sulfonic acids, and, in addition, about 0.01 to 0.15 gram per liter of a bath-soluble compound in accordance with the formula

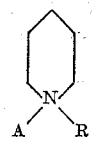

where A is an anion selected from the group consisting of chlorine and bromine, and R is an allyl radical.

9. A bath in accordance with claim 8, wherein said brightener is o-benzoyl sulfimide.

10. A bath for the electrodeposition of bright nickel comprising an aqueous acidic solution of at least one nickel salt selected from the group consisting of nickel chloride and nickel sulfate, said bath also containing, in solution, not more than about .5% of at least one brightener selected from the group consisting of organic sulfonamides, sulfonimides, and sulfonic acids, and, in addition, about .003 to 0.04 gram per liter of a bath-soluble compound in accordance with the formula

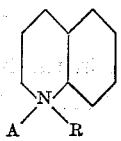

where A is an anion selected from the group consisting of chlorine and bromine, and R is an allyl radical.

11. A bath for the electrodeposition of bright nickel comprising an aqueous acidic solution of at least one nickel salt selected from the group consisting of nickel chloride and nickel sulfate, said bath also containing, in solution, not more than about .5% of at least one brightener selected from the group consisting of organic sulfonamides, sulfonimides, and sulfonic acids, and, in addition, about .003 to .04 gram per liter of a bath-soluble compound in accordance with the formula

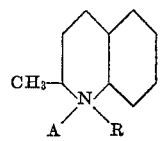

where A is an anion selected from the group consisting of chlorine and bromine, and R is an allyl radical.

12. A bath for the electrodeposition of bright nickel comprising an aqueous acidic solution of at least one nickel salt selected from the group consisting of nickel chloride and nickel sulfate, said bath also containing, in solution, not more than about .5% of at least one brightener selected from the group consisting of organic sulfonamides, sulfonimides, and sulfonic acids, and, in addition, about .003 to 0.04 gram per liter of a mixture of allyl quinolinium bromide and 2-methyl allyl quinolinium bromide.

13. A method of electrodepositing nickel to obtain a fine-grained, ductiled deposit of high brilliance which comprises electrolyzing an aqueous acidic solution of at least one nickel salt, said bath also containing, in solution, not more than about .5% of at least one brightener selected from the group consisting of organic sulfonamides, sulfonimides, and sulfonic acids, and, in addition, about .003 to .15 gram per liter of a bath-soluble compound in accordance with the formula

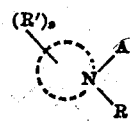

where

represents a compound of the pyridine series selected from the group consisting of pyridine, quinoline, isoquinoline and C-methyl and ethyl homologues thereof, A is an anion of a water-soluble acid, R is an aliphatic radical containing from 1 to 4 carbon atoms, R' is halogen, and $x$ is zero to 2.

14. A method of electrodepositing nickel to obtain a fine-grained, ductile deposit of high brilliance which comprises electrolyzing an aqueous acidic solution of at least one nickel salt selected from the group consisting of nickel chloride and nickel sulfate, said bath also containing, in solution, not more than about 0.5% of at least one brightener selected from the group consisting of organic sulfonamides, sulfonimides, and sulfonic acids, and, in addition, about 0.01 to 0.15 gram per liter of a bath-soluble compound in accordance with the formula

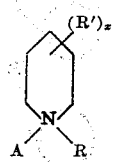

where A is an anion of a water-soluble acid, R is an aliphatic radical containing from 1 to 4 carbon atoms, R' is halogen, and $x$ is zero to 2.

15. A method of electrodepositing nickel to obtain a fine-grained, ductile deposit of high brilliance which comprises electrolyzing an aqueous acidic solution of at least one nickel salt selected from the group consisting of nickel chloride and nickel sulfate, said bath also containing, in solution, not more than about .5% of at least one brightener selected from the group consisting of organic sulfonamides, sulfonimides, and sulfonic acids, and, in addition, about .003 to 0.04 gram per liter of a bath-soluble compound in accordance with the formula

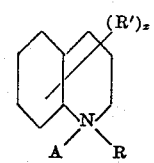

where A is an anion of a water-soluble acid, R is an aliphatic radical containing from 1 to 4 carbon atoms, R' is halogen selected from the group consisting of chlorine and bromine, and $x$ is zero to 2.

16. A method of electrodepositing nickel to obtain a fine-grained, ductile deposit of high brilliance which comprises electrolyzing an aqueous acidic solution of at least one nickel salt selected from the group consisting of nickel chloride and nickel sulfate, said bath also containing, in solution, not more than about .5% of at least one brightener selected from the group consisting of organic sulfonamides, sulfonimides, and sulfonic acids, and, in addition, about .003 to 0.04 gram per liter of at least one compound in accordance with the formulae

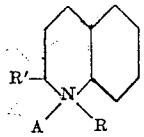

and

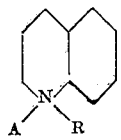

where A is an anion selected from the group consisting of chlorine and bromine, R is an allyl radical, and R' is a methyl radical.

17. In a bath for the electrodeposition of bright nickel comprising an aqueous acidic solution containing at least one nickel salt selected from the group consisting of nickel chloride and nickel sulfate, an additive for use in an amount of about .003 to .15 gram per liter in combination with at least one brightener selected from the group consisting of organic sulfonamides, sulfonimides and sulfonic acids in an amount of not more than .5% in said bath, said additive consisting of a compound having the formula

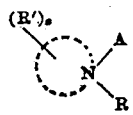

where

represents a compound of the pyridine series selected from the group consisting of pyridine, quinoline, isoquinoline and C-methyl and ethyl homologues thereof, A is an anion of a water-soluble acid, R is an aliphatic radical containing from 1 to 4 carbon atoms, R' is a halogen selected from the group consisting of chlorine and bromine, and $x$ is zero to 2.

18. An additive for an aqueous acidic solution containing at least one nickel salt selected from the group consisting of nickel chloride and nickel sulfate and at least one brightener selected from the group consisting of organic sulfonamides, sulfonimides and sulfonic acids in an amount of not more than about .5% in combination with said additive in an amount of about .003 to .15 gram per liter, said additive consisting of a compound having the formula

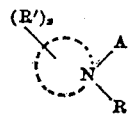

where

represents a compound of the pyridine series selected from the group consisting of pyridine, quinoline, isoquinoline and C-methyl and ethyl homologues thereof, A is an anion of a water-soluble acid, R is an aliphatic radical containing from 1 to 4 carbon atoms, R' is halogen selected from the group consisting of chlorine and bromine, and $x$ is zero to 2.

HENRY BROWN.

References Cited in the file of this patent

UNITED STATES PATENTS

| Number | Name | Date |
|---|---|---|
| 2,238,861 | Lind et al. | Apr. 15, 1941 |
| 2,315,802 | Lind et al. | Apr. 6, 1943 |

OTHER REFERENCES

Raub et al., "Metal Finishing," August 1940, pp. 429–432.